(12) United States Patent
Yonezawa et al.

(10) Patent No.: US 9,098,742 B2
(45) Date of Patent: Aug. 4, 2015

(54) IMAGE PROCESSING APPARATUS AND IMAGE PROCESSING METHOD

(75) Inventors: Keiko Yonezawa, Kawasaki (JP); Mitsuro Sugita, Vienna (AT); Hiroshi Imamura, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 13/602,534

(22) Filed: Sep. 4, 2012

(65) Prior Publication Data

US 2013/0058553 A1 Mar. 7, 2013

(30) Foreign Application Priority Data

Sep. 6, 2011 (JP) .................................. 2011-193914
Aug. 30, 2012 (JP) .................................. 2012-190565

(51) Int. Cl.
G06K 9/00 (2006.01)
G06T 7/00 (2006.01)

(52) U.S. Cl.
CPC ............ *G06K 9/0061* (2013.01); *G06T 7/0012* (2013.01); *G06T 2207/30041* (2013.01); *G06T 2207/30101* (2013.01)

(58) Field of Classification Search
USPC .......................................... 382/100, 128–132
See application file for complete search history.

(56) References Cited

U.S. PATENT DOCUMENTS

| 7,510,283 | B2 * | 3/2009 | Bille ............................. 351/243 |
| 7,794,083 | B2 * | 9/2010 | Tsukada et al. ............... 351/206 |
| 8,204,300 | B2 | 6/2012 | Sugita et al. |
| 8,274,660 | B2 | 9/2012 | Sugita |
| 8,408,704 | B2 * | 4/2013 | Tomidokoro et al. ......... 351/206 |
| 2011/0096333 | A1 | 4/2011 | Suehira et al. |
| 2011/0098560 | A1 | 4/2011 | Suehira et al. |
| 2011/0137157 | A1 | 6/2011 | Imamura et al. |
| 2011/0243415 | A1 | 10/2011 | Yonezawa et al. |
| 2011/0249236 | A1 | 10/2011 | Saito et al. |
| 2012/0044457 | A1 | 2/2012 | Sato et al. |
| 2012/0053904 | A1 | 3/2012 | Yuasa et al. |
| 2012/0063660 | A1 | 3/2012 | Imamura et al. |
| 2012/0130270 | A1 | 5/2012 | Imamura et al. |
| 2012/0194782 | A1 | 8/2012 | Imamura |
| 2012/0218557 | A1 | 8/2012 | Sugita et al. |
| 2012/0274904 | A1 | 11/2012 | Saito et al. |
| 2012/0293807 | A1 | 11/2012 | Sugita |
| 2012/0320339 | A1 | 12/2012 | Yonezawa |
| 2012/0330140 | A1 | 12/2012 | Yonezawa |

OTHER PUBLICATIONS

Kaccie Y. Li, et al., "Automated identification of cone photoreceptors in adaptive optics retinal images", J. Opt. Soc. Am. A., vol. 24, No. 5, May 2007, pp. 1358-1363.

Jacque L. Duncan, et al., "High-Resolution Imaging with Adaptive Optics in Patients with Inherited Retinal Degeneration", Investigative Ophthalmology & Visual Science, vol. 48, No. 7, Jul. 2007, pp. 3283-3291.

* cited by examiner

*Primary Examiner* — Shefali Goradia
(74) *Attorney, Agent, or Firm* — Fitzpatrick, Cella, Harper & Scinto

(57) ABSTRACT

An image processing apparatus for analyzing a plurality of images acquired of an eye to be inspected includes a photoreceptor cell analysis unit configured to analyze an area of each photoreceptor cell in a first image, a fundus analysis unit configured to analyze a characteristic of a fundus from a second image, an image associating unit configured to associate the first image with the second image, a characteristic value calculation unit configured to calculate a value of the characteristic for the area of the each photoreceptor cell from the association, and a display unit configured to display an image based on the value of the characteristic calculated for the each photoreceptor cell.

34 Claims, 10 Drawing Sheets

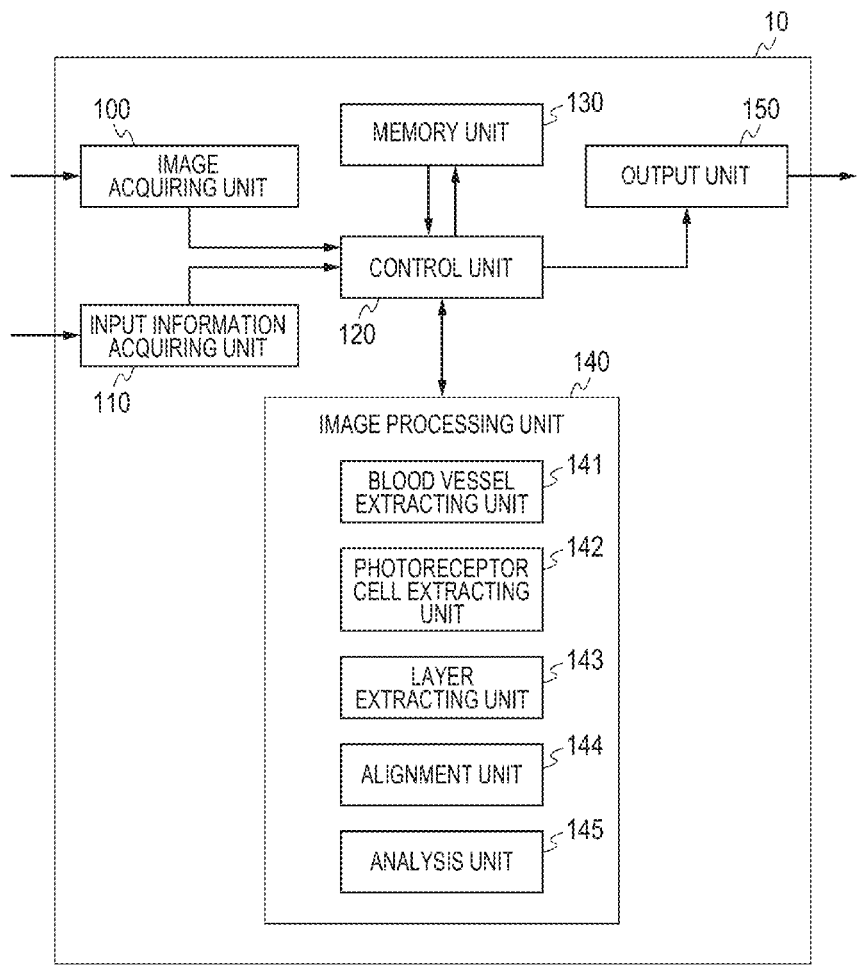

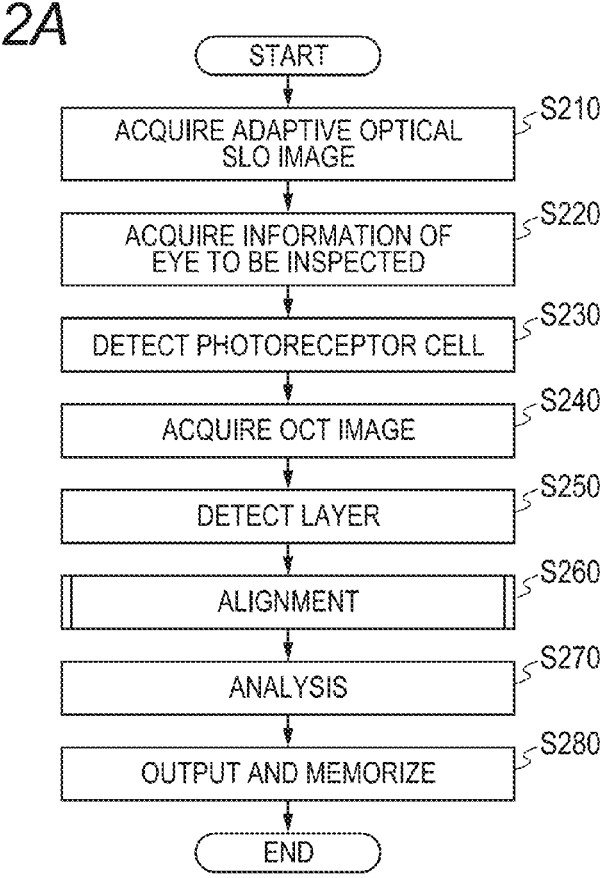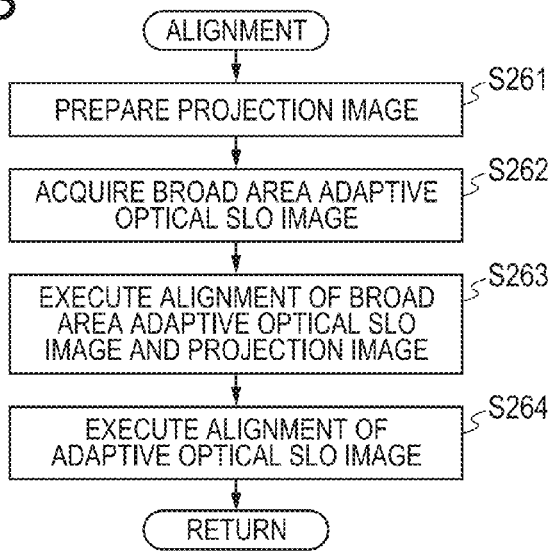

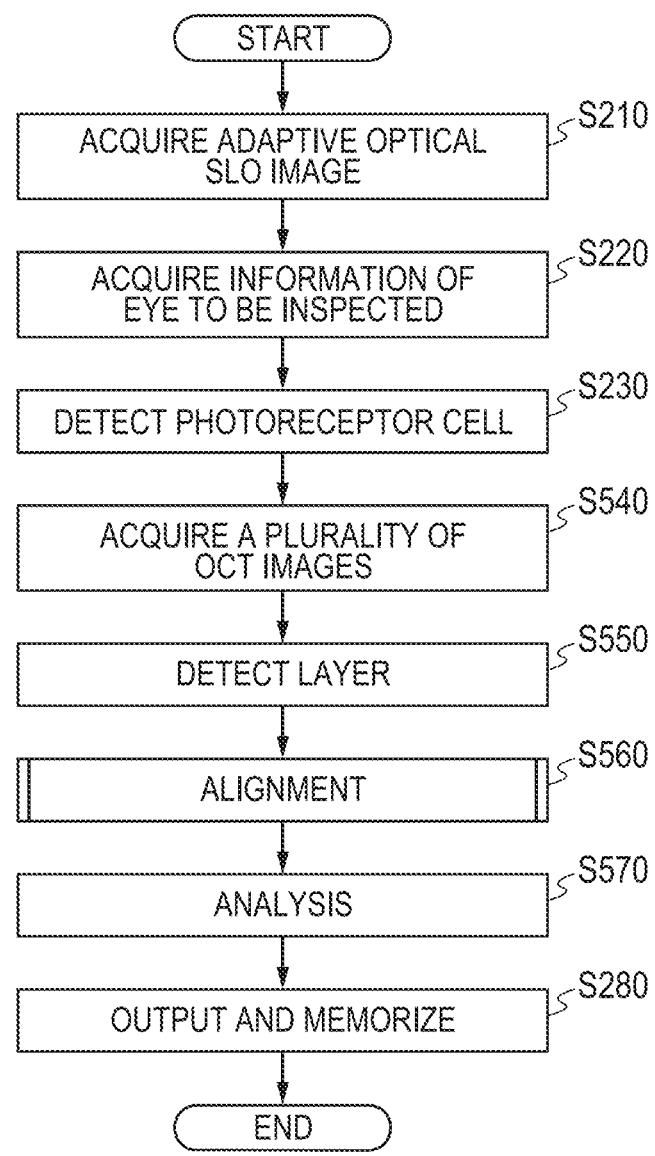

IMAGE PROCESSING APPARATUS AND IMAGE PROCESSING METHOD

BACKGROUND OF THE INVENTION

1. Field of the Invention

The present invention relates to an image processing apparatus and an image processing method, and more particularly, to an image processing apparatus and an image processing method used for ophthalmic care and the like.

2. Description of the Related Art

An examination of fundus of the eye is widely performed for the purpose of a diagnosis in early stage of a disease that usually ranks high in adult disease or cause of blindness. A scanning laser ophthalmoscope (SLO) which uses a principle of a confocal laser microscope is an apparatus that performs a raster scanning on a fundus of the eye with laser light which is measurement light and obtains a two-dimensional image of the fundus of the eye from return light with a high resolution at a high speed.

In recent years, an adaptive optics SLO has been developed which includes an adaptive optical system for measuring an aberration of an eye to be inspected in real time with a wavefront sensor and correcting the aberrations of measurement light and return light generated at the eye to be inspected with a wavefront correction device, enabling an acquisition of a two-dimensional image with a high lateral resolution. In addition, by extracting photoreceptor cells in a retina by using a required two-dimensional image of a retina, it is attempted to diagnose a disease and to evaluate a response to a drug from an analysis of a density and a distribution of the photoreceptor cells.

As an example of performing a visualization of the photoreceptor cells by using the adaptive optics SLO, there has been proposed, in Kaccie Y. Li and Austin Roorda, "Automated identification of cone photoreceptors in adaptive optics retinal images," J. Opt. Soc. Am. A, May 2007, Vol. 24, No. 5, p. 1358, an ophthalmoscopy apparatus capable of acquiring a two-dimensional image of a retina and performing an automatic extraction of the photoreceptor cells. In this ophthalmoscopy apparatus, a two-dimensional image of a retina with a high lateral resolution is acquired, and by removing a high frequency component by using periodicity of arrangement of the photoreceptor cells extracted from the image, an automatic detection of the photoreceptor cells is performed based on a maximum value detection. In addition, by using a detection result of the photoreceptor cells, a density of the photoreceptor cells and a distance between the photoreceptor cells are measured, and an analysis based on a Voronoi analysis of a spatial distribution. Further in Jacque L. Duncan, et al., "High-Resolution Imaging with Adaptive Optics in Patients with Inherited Retinal Degeneration," Investigative Ophthalmology & Visual Science, July 2007, Vol. 48, No. 7, p. 3283, an analysis is performed on a correlation between a density of detected photoreceptor cells and a retinal disease, and an association of an area in which the density of the photoreceptor cells is decreased with an area in which a visual sensitivity is decreased or cystoid macular edema (CME) is performed.

In the above described example, the analysis of the photoreceptor cells is performed with a method of, for example, calculating the density of the photoreceptor cells and the distance between the photoreceptor cells with a two-dimensional image acquired by the adaptive optics SLO. An abnormality such as a low density area found from the analysis is then compared with information obtained from another modality, for example, a change of a retinal thickness observed by an OCT, and a debate is held whether or not the abnormality matches the observed site.

SUMMARY OF THE INVENTION

The present invention is to provide an apparatus capable of calculating an abnormality observation in a more accurate manner by evaluating an influence of information obtained from a result of detecting photoreceptor cells, such as a density and a distribution of the photoreceptor cells, and information obtained from other means on the photoreceptor cells for each photoreceptor cell.

In order to obtain the above-mentioned effect, according to an exemplary embodiment of the present invention, there is provided an image processing apparatus for analyzing a plurality of images acquired of an eye to be inspected, the image processing apparatus including: a characteristic value calculation unit configured to calculate a characteristic value of an area of a second image of a fundus of the eye to be inspected corresponding to a predetermined area in a first image including photoreceptor cells of the fundus of the eye to be inspected; and a display control unit configured to display an image obtained by visualizing the characteristic value on a display unit.

Further, in order to obtain the above-mentioned effect, according to an exemplary embodiment of the present invention, there is provided an image processing method for analyzing a plurality of images acquired of an eye to be inspected, the image processing method including: calculating a characteristic value of an area of a second image of a fundus of the eye to be inspected corresponding to a predetermined area in a first image including photoreceptor cells of the fundus of the eye to be inspected; and displaying an image obtained by visualizing the characteristic value on a display unit.

According to the present invention, an evaluation index of each photoreceptor cell can be presented.

Further features of the present invention will become apparent from the following description of exemplary embodiments with reference to the attached drawings.

BRIEF DESCRIPTION OF THE DRAWINGS

FIG. 1 is a diagram illustrating a functional configuration of an image processing apparatus according to a first embodiment of the present invention.

FIG. 2A is a flowchart illustrating a processing procedure of the image processing apparatus according to the first embodiment.

FIG. 2B is a flowchart illustrating a detailed process of an alignment in the flowchart illustrated in FIG. 2A.

FIGS. 3A and 3B are schematic diagrams illustrating high resolution two-dimensional images of photoreceptor cells acquired by an adaptive optics SLO apparatus, in which FIG. 3A illustrates a case in which a blood vessel is included in an image area, and FIG. 3B illustrates a case in which the blood vessel is not included in the image area.

FIG. 8 is a flowchart illustrating a processing procedure of the image processing apparatus (10) according to a third embodiment of the present invention.

DESCRIPTION OF THE EMBODIMENTS

Figure 3A:
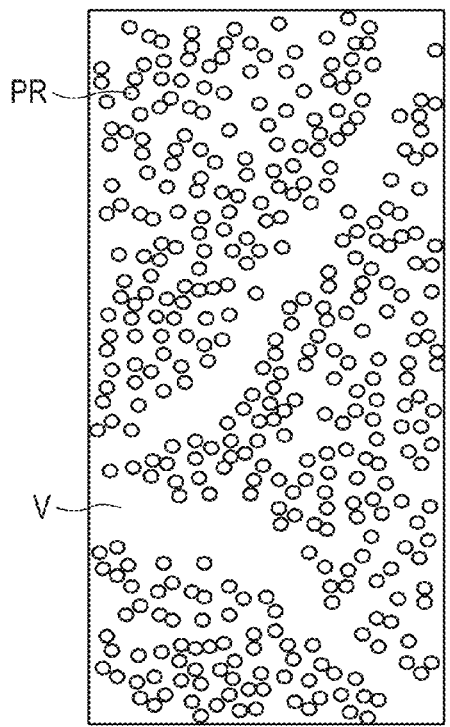

Preferred embodiments of the present invention will now be described in detail in accordance with the accompanying drawings.

The inventor considers that although a change in the density of the photoreceptor cells causes, for example, a change of an oxygen amount supplied to each photoreceptor cell, a magnitude of the influence is also changed by a state of an oxygen source. That is, a little change of the density has less influence on each photoreceptor cell in an area where there is a rich supply of oxygen. However, in an area where there is a poor supply of oxygen, the same change of the density has more influence on each photoreceptor cell.

An influence of a choroid is attracting attention as an oxygen source for the photoreceptor cells so that a method of measuring a thickness of the choroid has been proposed. Thus, as for an influence that is understood only after considering a correlation with information obtained from another modality, a sufficient analysis cannot be obtained simply by comparing abnormality sites obtained from respective modalities.

The embodiments have been made in view of the above-mentioned understanding of the inventor, and the present invention is to provide an apparatus capable of calculating an abnormality observation in a more accurate manner by evaluating an influence of information obtained from a result of detecting photoreceptor cells, such as a density and a distribution of the photoreceptor cells, and information obtained from other means on the photoreceptor cells for each photoreceptor cell.

First Embodiment

In a first embodiment of the present invention, a process of estimating an oxygen amount supplied to each photoreceptor cell from a thickness of a choroid that is considered to take a role of supplying oxygen and the like to photoreceptor cells and visualizing the estimation is described. Specifically, a volume of the choroid per each photoreceptor cell is calculated and visualized by combining distribution information of the photoreceptor cells obtained from a two-dimensional fundus image (hereinafter, referred to as a "two-dimensional image") acquired by an adaptive optics SLO and information on the thickness of the choroid obtained from a tomographic fundus image (hereinafter, referred to as a "tomographic image") acquired by an optical coherence tomography (OCT).

In general, the photoreceptor cells have a high density near a macula and the density becomes lower as a distance increases from the macula. In an area of a high density and an area of a low density, it is expected that an effect due to a decrease of thickness of the choroid differs from each other. In the first embodiment, by presenting a map of the thickness of the choroid, a map of the density of the photoreceptor cells, and a map of a volume of the choroid per each photoreceptor cell, an area in which photoreceptor cells with an insufficient amount of the choroid that is a source of supplying the oxygen are gathering can be clearly specified.

(Two-dimensional Image)

Figure 3B:
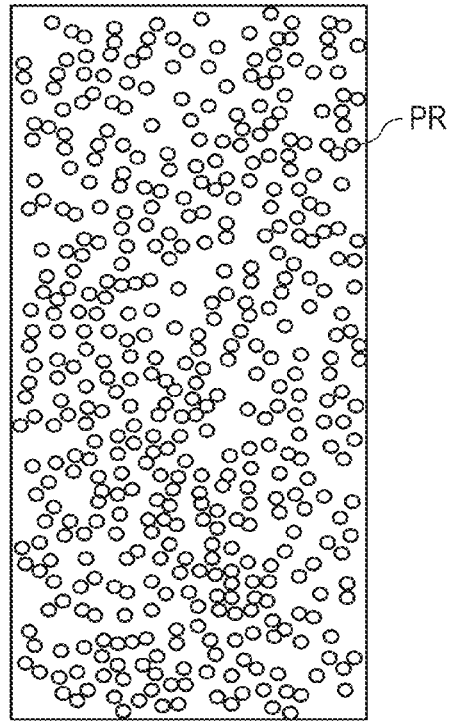

FIGS. 3A and 3B schematically illustrate two-dimensional images of photoreceptor cells acquired by the adaptive optics SLO. As illustrated in FIGS. 3A and 3B, each photoreceptor cell PR is delineated one by one in a separate manner as a small area having a relatively high luminance. In addition, a blood vessel area V of an area having a low luminance compared to the luminance of the photoreceptor cell is delineated. The blood vessel area V is an area in which a shadow of a blood vessel in an upper layer than the photoreceptor cells is delineated.

(Tomographic Image)

Figure 5A:
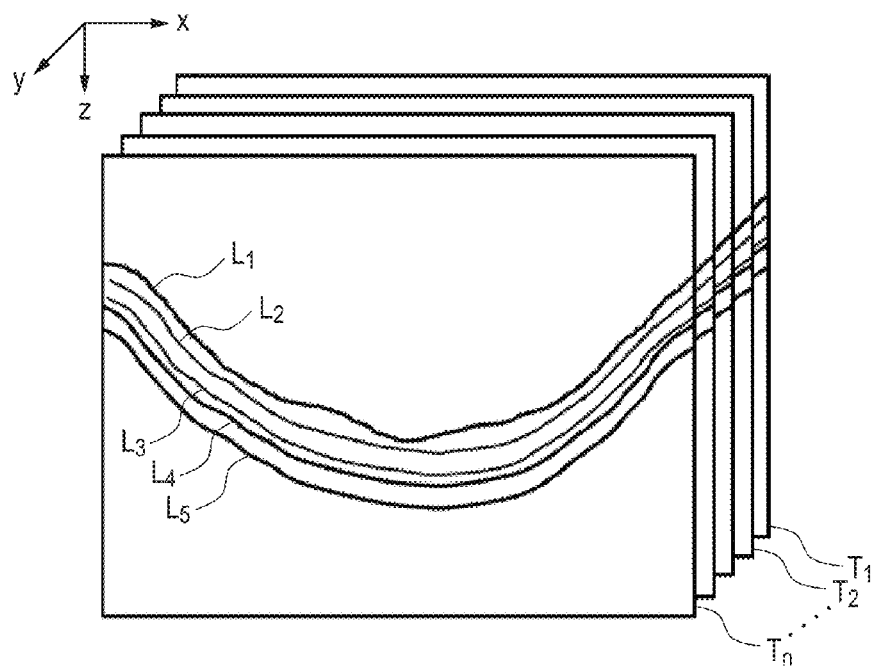
FIG. 5A is a schematic diagram illustrating a choroid tomographic image group taken by an optical coherence tomography apparatus.

The OCT, which takes a tomographic image of a fundus by using an interference of light beams, is widely used in the field of an ophthalmic care because a state of an internal structure of a retina of the fundus can be observed in a three-dimensional manner with the OCT. FIG. 5A schematically illustrates a tomographic image near the macula acquired by the OCT. In FIG. 5A, $T_1$ to $T_n$ represent tomographic images (B-scan images), respectively, and information of the retina is represented in a three-dimensional manner by a tomographic image group including a plurality of tomographic images.

In FIG. 5A, $L_1$ to $L_5$ indicate a boundaries of the layer structure of the choroid, where $L_1$ indicates a boundary between an internal limiting membrane and its upper tissue (hereinafter, referred to as "ILM"), $L_2$ indicates a boundary between a nerve fiber layer and its lower layer (hereinafter, referred to as "NFL"), $L_3$ indicates a boundary between a photoreceptor inner/outer segment junction and its upper layer (hereinafter, referred to as "IS/OS"), $L_4$ indicates a boundary between a retinal pigment epithelium and its lower tissue (hereinafter, referred to as "RPE"), and $L_5$ indicates a boundary between the choroid and its lower scleral tissue.

In order to acquire an image of a tissue below the choroid, an image is taken by bringing a high penetration OCT (HP-OCT) using a long wavelength light source or a normal SD-OCT as close to the eye as possible and aligning a coherence gate position on the choroid side.

(Configuration of Image Processing Apparatus)

FIG. 1 is a diagram illustrating a functional configuration of an image processing apparatus 10 according to one embodiment of the present invention.

In FIG. 1, an image acquiring unit 100 acquires a two-dimensional image of the retina from the adaptive optics SLO and a tomographic image of the choroid from the OCT.

An input information acquiring unit 110 acquires positional information of a fixation lamp at the time of taking the two-dimensional image by the adaptive optics SLO from the adaptive optics SLO apparatus. The acquired positional information is stored in a memory unit 130 via a control unit 120.

An image processing unit 140 includes a blood vessel extracting unit 141, a photoreceptor cell extracting unit 142, a layer extracting unit 143, an alignment unit 144, and an analysis unit 145. The image processing unit 140 executes an alignment by extracting a blood vessel (an area corresponding to the blood vessel) from each of the acquired two-dimensional image and the acquired tomographic image, calculates a volume of the choroid per photoreceptor cell from the photoreceptor cells (areas corresponding to the photoreceptor cells) extracted from the two-dimensional image and the choroid layer (an area corresponding to the choroid layer) extracted from the tomographic image, and stores the calculated volume in the memory unit 130.

An output unit 150 outputs an analysis result to a monitor and the like, and outputs a processing result stored in the memory unit 130 to a database.

Although the image processing apparatus 10 is configured to acquire the two-dimensional image and the tomographic image from the adaptive optics SLO and the OCT, respectively, in a direct manner in the first embodiment, the images may be acquired through a network. In this case, the two-dimensional image and the tomographic image taken by the adaptive optics SLO and the OCT, respectively, and information on an eye to be inspected and information on date and time of the images are stored in a database connected via the network, and the image processing apparatus 10 is configured to acquire the images and the information from the database.

(Processing Procedure of Image Processing Apparatus)

A processing procedure of the image processing apparatus 10 according to the first embodiment is described with reference to a flowchart illustrated in FIG. 2A.

(Step S210)

In Step S210, the image acquiring unit 100 acquires a two-dimensional image to be analyzed from the adaptive optics SLO connected to the image processing apparatus 10 or a database storing therein the two-dimensional image taken by the adaptive optics SLO. The acquired two-dimensional image is stored in the memory unit 130 via the control unit 120.

At this time, the image acquiring unit 100 acquires imaging parameter information when the acquired two-dimensional image is taken, and stores the acquired imaging parameter information in the memory unit 130 via the control unit 120. The imaging parameter information includes various pieces of information including a position of a fixation lamp and the like when the acquired two-dimensional image is taken. The imaging parameter information including the position of the fixation lamp and the like is included in an imaging information file attached to the two-dimensional image in some cases and included as tag information of the image in other cases.

(Step S220)

In Step S220, the input information acquiring unit 110 acquires information on the eye to be inspected from a database or an input from an input unit (not shown) by an operator. The information on the eye to be inspected includes a patient ID of the eye to be inspected, name, age, and sex of a patient, whether the subject to be inspected is the right eye or the left eye, date and time of taking the image, and the like, and the acquired information is stored in the memory unit 130 via the control unit 120.

(Step S230)

In Step S230, the photoreceptor cell extracting unit 142 extracts areas corresponding to photoreceptor cells from the two-dimensional image acquired from the adaptive optics SLO which is stored in the memory unit 130.

As illustrated in FIGS. 3A and 3B, the photoreceptor cells are observed in the two-dimensional image as small areas having a high luminance. FIG. 3A illustrates a case in which a blood vessel is included in an imaging area, where a blood vessel area is observed as an area in which the photoreceptor cells are not observed. FIG. 3B illustrates a case in which the blood vessel and the like are not included in the imaging area, where the photoreceptor cells are uniformly observed in the entire image. In order to extract the small areas corresponding to the photoreceptor cells, a combination of filters for detecting local maximum points is employed. In the first embodiment, a process is performed by using a Gaussian filter for removing a noise and a Laplacian filter for detecting the local maximum points, and candidate areas of the photoreceptor cells are selected by a binarization of a result of the process by using a threshold value determined based on an experimental result. After an isolated point is removed and an interpolation process is performed, each isolated area is extracted. A position of each photoreceptor cell is determined by obtaining a center of each isolated area.

A size per each photoreceptor cell is further calculated. A method of calculating the size includes selecting an area and obtaining the size per photoreceptor cell from a size of the area and the number of photoreceptor cells included in the area. Alternatively, a Voronoi analysis, which is often used when analyzing a spatial distribution of the photoreceptor cells, may be used to calculate the size.

Figure 4A:
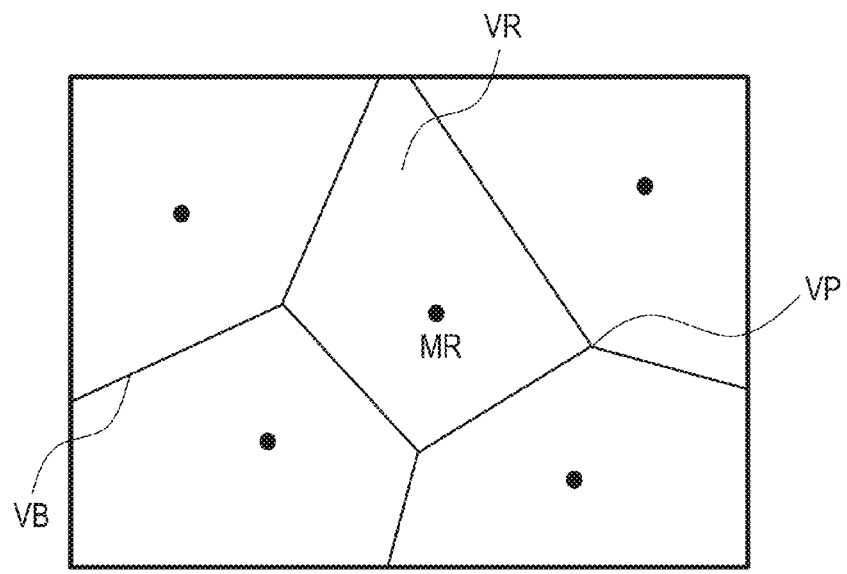
FIG. 4A illustrates a Voronoi diagram.

An outline of the Voronoi analysis is illustrated in FIG. 4A. In FIG. 4A, MP represents a mass point, VP represents a Voronoi point, VR represents a Voronoi region, and VB represents a Voronoi boundary. In the Voronoi analysis, adjacent mass points MP are first connected with a straight line and an area is divided by a perpendicular bisector of the straight line. The minimum area surrounded by such perpendicular bisectors is referred to as the Voronoi region VR of each mass point, a vertex of the Voronoi region is referred to as the Voronoi point VP, and a side of the Voronoi region is referred to as the Voronoi boundary VB. A size per each mass point and a positional relationship between adjacent mass points can be analyzed by the Voronoi analysis.

Figure 4B:
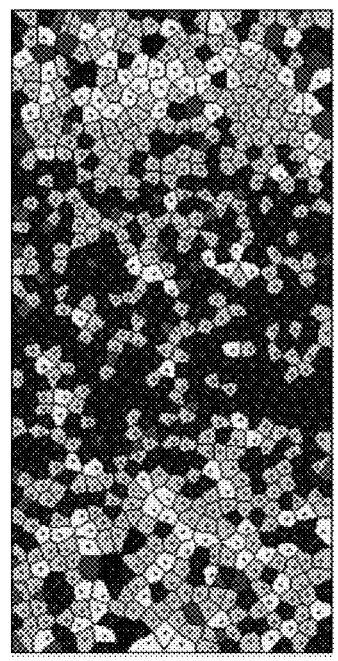
FIG. 4B is a diagram illustrating an example of a Voronoi analysis of the photoreceptor cells.

FIG. 4B is a schematic diagram illustrating a case in which the Voronoi analysis is performed considering each detected photoreceptor cell as a mass point. In FIG. 4B, each Voronoi region is displayed with a different brightness based on a size of the area. With such Voronoi analysis, a distribution profile and a change of the density of each photoreceptor cell can be visualized.

In the present invention, the photoreceptor cell extracting unit 142 functions as a photoreceptor cell analysis unit for extracting an area corresponding to each photoreceptor cell from a first image obtained from an eye to be inspected and performing an analysis such as obtaining a size of the area. In the first embodiment, the first image corresponds to the two-dimensional image acquired from the adaptive optics SLO.

A result of extracting the photoreceptor cells obtained here is stored in the memory unit 130 via the control unit 120.

(Step S240)

In Step S240, the image acquiring unit 100 acquires a tomographic image group to be analyzed from the OCT connected to the image processing apparatus 10 or the database storing therein the tomographic image taken by the OCT. The acquired tomographic image group is stored in the memory unit 130 via the control unit 120. The tomographic image group to be analyzed here is images of the same eye to be inspected for which the two-dimensional image stored in the memory unit 130 has been taken. When there exists a plurality of tomographic image groups in the database, a tomographic image group having date and time of taking the images closest to that of the two-dimensional image is acquired. The acquired tomographic image group is stored in the memory unit 130 via the control unit 120.

(Step S250)

In Step S250, the layer extracting unit 143 detects a layer boundary of the choroid from each of the tomographic images stored in the memory unit 130. Although various methods are known as a layer segmentation method, in the first embodiment, a method involving extracting an edge serving as a layer boundary by using an edge enhancement filter, and then associating the detected edges with the layer boundary by using a medical knowledge on the choroid layer is described. Although a detection of the RPE ($L_4$) and the scleral boundary ($L_5$) is described because the detection of the RPE and the scleral boundary is necessary to measure the thickness of the choroid, other layer boundary can be detected by the same method.

The layer extracting unit 143 performs a smoothing filter process on the tomographic image to remove a noise component. The layer extracting unit 143 then performs an edge detection filter process to detect an edge component from the tomographic image, and extracts an edge corresponding to a boundary of the layers. The layer extracting unit 143 further identifies a background area from the tomographic image from which the edge is detected, and extracts a luminance value of the background area from the tomographic image. The layer extracting unit 143 then determines the boundary of each layer by using a peak value of the luminance value of the edge component and a luminance value between peaks.

For example, the layer extracting unit 143 searches for an edge in a depth direction of the fundus from a vitreous side, and determines a boundary between the vitreum and a retina layer (ILM) from a peak of a luminance value of the edge component, its upper and lower luminance values, and a luminance value of the background. The layer extracting unit 143 further searches for the edge in the depth direction of the fundus, and determines a boundary of a pigment layer of the retina (RPE) by referring to the peak of the edge component, the luminance value between peaks, and the luminance value of the background. In addition, the layer extracting unit 143 searches for the edge in the depth direction of the fundus from the scleral side, and determines a scleral boundary ($L_5$) from the peak of the edge component, its upper and lower luminance values, and the luminance value of the background. The boundary of the layer can be detected by the above-mentioned process.

These operations of the layer detection are performed on each position in the tomographic image. The above-mentioned luminance value is an example of a parameter used to detect the layer, and is understood as a characteristic value representing a characteristic of the image in the depth direction in the present invention. In the present invention, the layer extracting unit 143 functions as a fundus analysis unit for extracting the characteristic value obtained at each position in the fundus image from the second image obtained from the fundus and analyzing a state of an existence of the layers.

The layer extracting unit 143 sends a boundary (control point) between the detected RPE ($L_4$) and the detected scleral boundary ($L_5$) to the control unit 120, and at the same time, stores the boundary in the memory unit 130.

(Step S260)

In Step S260, the alignment unit 144 executes an alignment of the two-dimensional image and the tomographic image group stored in the memory unit 130. A procedure of the alignment process in Step S260 is described below with reference to the flowchart illustrated in FIG. 2B.

(Step S261)

Figure 5B:
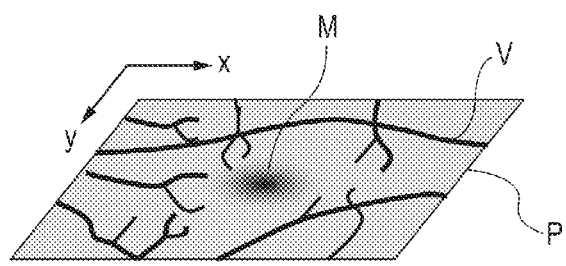
FIG. 5B is a schematic diagram of a projection image of the choroid tomographic image group.

In Step S261, the alignment unit 144 acquires the tomographic image group taken by the OCT apparatus and stored in the memory unit 130, and creates a projection image obtained by accumulating each of the tomographic images (B-scan images) in the depth direction. FIG. 5A illustrates cross-sectional images $T_1$ to $T_n$ at the macula, and FIG. 5B illustrates a projection image P created from the cross-sectional images $T_1$ to $T_n$. The depth direction is a z-direction in FIG. 5A, and the accumulation of the cross-sectional images in the depth direction is a process of summing the optical intensities (luminance values) at depth positions in the z-direction in FIG. 5A. The projection image P may be a value obtained by simply summing the luminance values at the depth positions or an average value obtained by dividing the sum value by the number of summation. The projection image P does not need to sum the luminance values of all pixels in the depth direction, but may be obtained by summing the luminance values only in an arbitrary range in the depth direction. For example, the luminance values only in the retina layer may be summed while performing the detection for the entire retina layer in advance. Alternatively, the luminance values only in an arbitrary layer in the retina layer may be summed. In the projection image P illustrated in FIG. 5B, it is represented that the luminance value increases as the accumulated value increases, and the luminance value decreases as the accumulated value decreases. A curve V in the projection image P illustrated in FIG. 5B indicates a blood vessel, and a circle M at the center of the image indicates a macula portion. In a site where there is a blood vessel, a reflected light intensity at a position deeper than the blood vessel is likely to be weaker, and a value accumulated in the z-direction is smaller than a value of a site where there is no blood vessel. Therefore, by creating the projection image P, an image having a contrast between the blood vessel and the other portion can be obtained.

(Step S262)

In Step S262, the image acquiring unit 100 acquires a broad area two-dimensional image including a two-dimensional image to be analyzed from the adaptive optics SLO apparatus connected to the image processing apparatus 10 or a database storing therein the two-dimensional image taken by the adaptive optics SLO apparatus. At the same time, the image acquiring unit 100 acquires a position of visual fixation when the broad area two-dimensional image has been taken. Although the position of the visual fixation at the time of taking the broad area two-dimensional image is a fixed reference visual fixation position, the visual fixation may be moved in some cases due to an eye disease. The acquired broad area two-dimensional image and the position of the visual fixation are stored in the memory unit 130 via the control unit 120.

Figure 6A:
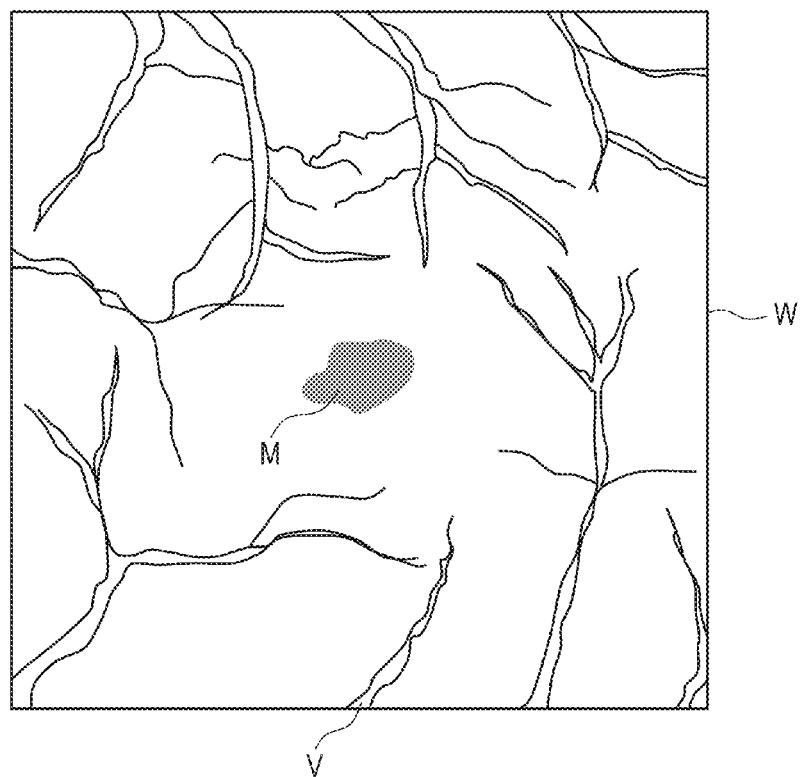
FIG. 6A is a schematic diagram of a broad area two-dimensional image taken by the adaptive optics SLO apparatus.

The broad area two-dimensional image to be analyzed here is an image taken of the same eye to be inspected of which the two-dimensional image stored in the memory unit 130 has been taken on the same day, over a broader area than the two-dimensional image has been taken. FIG. 6A is a schematic diagram of a broad area two-dimensional image W. When there is no broad area two-dimensional image taken on the same day, a broad area two-dimensional image having date and time of taking the image closest to that of the two-dimensional image is acquired and used from other broad area two-dimensional images of the same eye to be inspected stored in the database.

(Step S263)

Figure 6B:
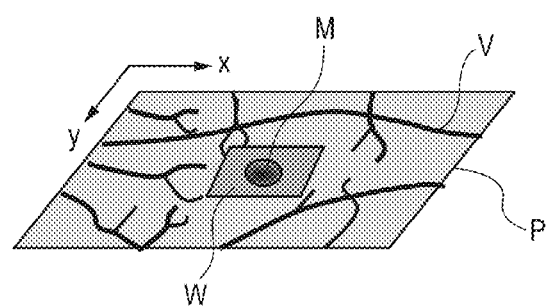
FIG. 6B illustrates an image obtained by superimposing the projection image illustrated in FIG. 5B with the two-dimensional image.

In Step S263, the alignment unit 144 performs a superimposition of the projection image created in Step S261 and the broad area two-dimensional image acquired in Step S262. FIG. 6B illustrates the broad area two-dimensional image W superimposed on the projection image illustrated in FIG. 5B.

The blood vessel extracting unit 141 extracts a blood vessel from both the projection image and the broad area two-dimensional image, and the alignment is executed by using a characteristic of the blood vessel. As the blood vessel has a narrow line-shaped structure, the blood vessel is extracted by using a filter that enhances the line-shaped structure. As the filter that enhances the line-shaped structure, a filter is used which calculates a difference between an average value of an image density value in a structural element when a line segment is set to the structural element and an average value in a local area surrounding the structural element. However, the filter is not limited to the above-mentioned one, but it can be a differential filter such as a Sobel filter. Alternatively, an eigenvalue of a Hesse matrix can be calculated for each pixel of a density value image so that a line-shaped area is extracted from a combination of two eigenvalues obtained as a result. A top-hat operation can also be used with a simple line segment as the structural element.

An alignment of the images is executed by using blood vessels respectively extracted from the projection image and the broad area two-dimensional image. By obtaining scale parameters ($S_x$, $S_y$), position coordinate parameters (x, y), and a rotation parameter (rot) of the broad area two-dimensional image with the projection image as a reference image, an alignment of the projection image and the broad area two-dimensional image can be executed.

When executing the alignment, an evaluation value indicating a similarity between two images is defined in advance, and a modification of the images is performed to obtain the best evaluation value. As for the evaluation value, a value indicating a degree of a superimposition between a projection image blood vessel area and a fundus image blood vessel area obtained from the above-mentioned processing, a distance between corresponding landmarks when focusing attention on an area having a characteristic geometric shape such as a vascular bifurcation, and the like can be used. In addition, although the blood vessel has been used as an anatomically characteristic area in the first embodiment, other anatomic characteristic such as an optic disk area, or a leukoma or a bleeding area caused by a disease may be used. Further, without focusing attention on only the anatomic characteristic such as the blood vessel, an evaluation value calculated from the entire image, such as a mean squared error of a luminance value, a correlation coefficient, and a mutual information amount, can also be used.

(Step S264)

In Step S264, the alignment unit 144 acquires the two-dimensional image taken by the adaptive optics SLO which is stored in the memory unit 130, and at the same time, acquires a position of visual fixation when the two-dimensional image has been taken. The alignment of the two-dimensional image and the broad area two-dimensional image is executed based on the position of the visual fixation when the broad area two-dimensional image has been taken and the position of the visual fixation when the two-dimensional image has been taken. The alignment in this step is executed based on an association of the position of the visual fixation at the time of setting a fixation lamp and an image acquisition position, which is prepared in advance.

In the present invention, the alignment unit 144 described above functions as an image associating unit for associating the broad area two-dimensional image, which is a first image, with the projection image, which is a second image, and enabling a superimposition of these images.

The alignment unit 144 sends a result of the alignment obtained in the above-mentioned manner to the control unit 120 and stores the result in the memory unit 130.

(Step S270)

In Step S270, the analysis unit 145 calculates an amount of the choroid per photoreceptor cell from a distribution of the photoreceptor cells acquired from the two-dimensional image stored in the memory unit 130 and information on the thickness of the choroid acquired from the tomographic image group.

A volume of the choroid for each photoreceptor cell is calculated based on the position and the size of each photoreceptor cell detected in Step S230, the thickness of the choroid detected in Step S250, and the result of alignment obtained in Step S260.

In Step S250, the thickness of the choroid is calculated in each of the tomographic images (B-scan images), and hence an interpolation is performed between the tomographic images. A method of the interpolation may include a linear interpolation between adjacent tomographic images and a spline interpolation in which anatomic structures are reflected to a greater extent. In this manner, the thickness of the choroid corresponding to the whole area on the projection image obtained from the tomographic image group may be obtained.

Subsequently, positions of the two-dimensional image taken by the adaptive optics SLO and each photoreceptor cell detected on the image on the projection image are acquired based on the result of the alignment executed in Step S260. The thickness of the choroid at a corresponding position is then acquired, and an integral value in an area occupied by each photoreceptor cell is calculated. A map for visualizing the amount of the choroid per photoreceptor cell is created by changing colors of the Voronoi diagram based on the integral value.

Figure 7A:
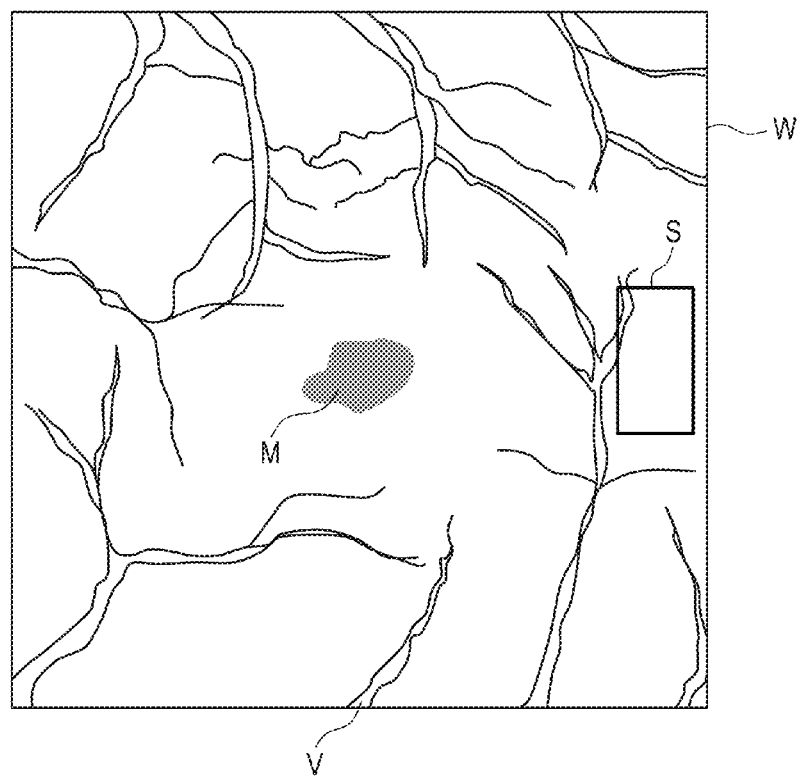
FIG. 7A is a schematic diagram illustrating a case in which a Voronoi display is performed in a broad area two-dimensional image.
Figure 7B:
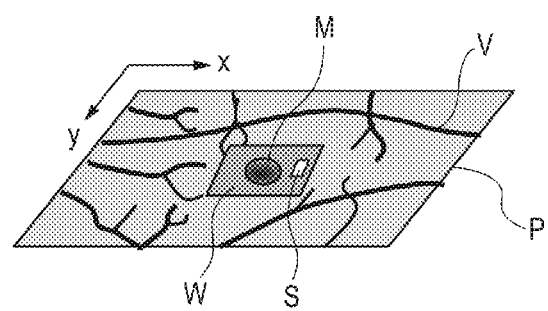
FIG. 7B is a schematic diagram illustrating a relationship between a high resolution image and the broad area two-dimensional image illustrated in FIG. 7A.

FIG. 7A illustrates an area S that is a portion on which the Voronoi display is performed in the broad area two-dimensional image acquired in Step S262. FIG. 7B illustrates a state in which the broad area two-dimensional image is superimposed on the projection image created in Step S261.

In the present invention, the analysis unit 145 that performs the above-mentioned operation functions as a characteristic value calculation unit for calculating a characteristic value for each area based on characteristic values of each portion in the two-dimensional image associated by the image associating unit and each portion in the projection image. That is, the characteristic value calculation unit calculates a characteristic value of an area in the tomographic image, which is a second image corresponding to a predetermined area in the broad area two-dimensional image, which is a first image of the present invention.

The analysis unit 145 sends a map for visualizing the amount of the choroid per photoreceptor cell calculated in the above-mentioned manner to the control unit 120 and stores the map in the memory unit 130.

(Step S280)

Figure 9A:
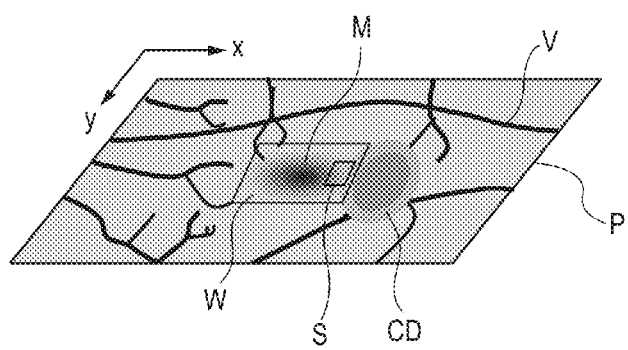
FIG. 9A is a diagram illustrating an example of a projection image when there exists a site in which the thickness of the choroid is thin in the first embodiment.
Figure 9B:
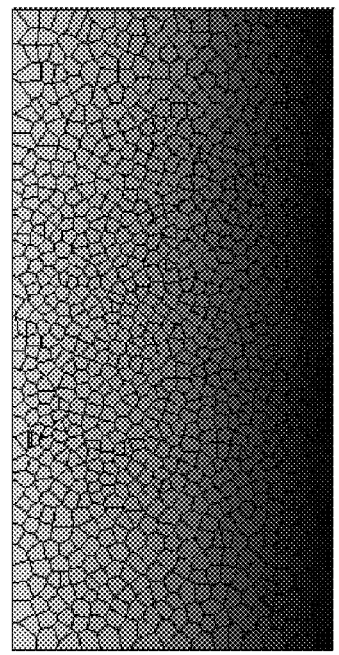
FIG. 9B illustrates an example of displaying a Voronoi diagram of an image illustrated in FIG. 9A with coloring only for the thickness of the choroid.
Figure 9C:
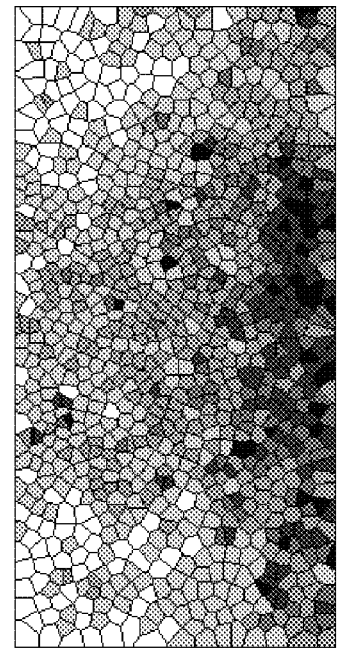
FIG. 9C illustrates an example mapping display obtained by coloring based on an accumulated value of the thickness of the corresponding choroid in the Voronoi region.

In Step S280, the output unit 150 displays the map for visualizing the amount of the choroid per photoreceptor cell stored in the memory unit 130 in Step S270 on a monitor. In addition, the output unit 150 stores the information on the result of the analysis stored in the memory unit 130 in Steps S210 to S290 in a database. FIGS. 9A to 9C illustrate the map displayed on the monitor. The monitor corresponds to a display unit for displaying an image in the present invention, and the output unit 150 corresponds to a display control unit for displaying the image obtained by visualizing the characteristic value on the monitor.

FIG. 9A illustrates a mapping of a site (CD) in which the thickness of the choroid detected by the OCT is thin on the projection image. At this time, the site CD is located on the right side of the image acquisition position on the adaptive optics SLO, and hence coloring only for the thickness of the choroid on the Voronoi display of the adaptive optics SLO image illustrated in FIG. 4B produces the image as illustrated in FIG. 9B. In FIG. 9B, an increase of a density of the color indicates a decrease of the thickness of the choroid. FIG. 9C illustrates a diagram obtained from a coloring based on a value obtained by accumulating the corresponding thickness of the choroid in each Voronoi area for each photoreceptor cell. In FIG. 9C, an increase of a density of the color indicates a decrease of the amount of the choroid of each photoreceptor cell.

Such a map display is performed by a portion that functions as a display coloring unit in the analysis unit 145, and each map colored by the display coloring unit is output from the output unit 150. That is, an operation such as the coloring is performed in accordance with the characteristic value such as the above-mentioned amount of the choroid of the photoreceptor cell. The above-mentioned display control unit displays the map on the monitor by specifying color and contrast of the colored image in accordance with an output from the output unit 150.

While FIG. 4B shows that the density of the photoreceptor cells is increased at the center portion, FIG. 9B shows that the thickness of the choroid is decreased toward the right side. By combining these two effects, a densely colored area is displayed as an area in which the amount of the choroid per photoreceptor cell is small in FIG. 9C. By performing such a display, a distribution of the amounts of the choroid per photoreceptor cell can be found.

In the present invention, the output unit 150 functions as the display control unit for displaying an image on which a visualization process is performed based on the characteristic value calculated by the characteristic value calculation unit for each area on the monitor.

With the above-mentioned configuration, when performing an analysis of photoreceptor cells by using a two-dimensional image acquired by the adaptive optics SLO apparatus, an image obtained by combining not only the information such as the density of the photoreceptor cells obtained from a single two-dimensional image but also the information obtained from the OCT can be displayed. By employing such a combination, for example, the amount of the choroid per photoreceptor cell can be visualized, thus providing an effect of visualizing an influence of a decrease of the thickness of the choroid per photoreceptor cell.

In the above-mentioned first embodiment, generation and display of the above-mentioned map are performed by setting a boundary for each photoreceptor cell from the Voronoi analysis and obtaining the thickness of the choroid of an area corresponding to a photoreceptor cell thus identified. However, the present invention is not limited to this example, but any scheme can be adopted in performing analysis and detection from a tomographic image for a specific layer such as a choroid layer in a fundus corresponding to a photoreceptor cell, calculating a thickness of an area corresponding to an area of a photoreceptor cell or the like arbitrarily specified in a two-dimensional image of a fundus in the specific layer based on a result of the analysis, and performing visualization and display based on gradation and coloring for each area in which the calculated thickness is specified. In this case, the analysis and the detection of the specific layer from the tomographic image are performed by the layer extracting unit 143 and the analysis unit 145 that function as an analysis unit in the scheme. In addition, the setting of the arbitrary area corresponding to the photoreceptor cell is performed by the photoreceptor cell extracting unit 142, and the calculation of the thickness of the specific layer at a portion corresponding to the area is performed by the analysis unit 145 that functions as a calculation unit in the scheme. Further, the visualization by the gradation and the coloring of the obtained area and a display on a display unit such as a monitor are performed by the output unit 150 and the control unit 120 that function as a display control unit in the scheme.

Moreover, in this case, the above-mentioned calculation unit may calculate the thickness of the specific layer corresponding to the arbitrary area as described above or may calculate a density of the area. In such a case, it is preferred that the display control unit generate an image obtained by associating the thickness and the volume of the layer or the thickness and the density of the layer and display the generated image on the display unit.

Second Embodiment

In the first embodiment, the volume of the choroid for each photoreceptor cell is visualized by detecting the photoreceptor cells from the two-dimensional image acquired by the adaptive optics SLO and obtaining information on the thickness of the choroid that cannot be obtained from the two-dimensional image from the tomographic image group acquired by the OCT. However, the subject on which the analysis is performed for each photoreceptor cell is not limited to the choroid, but a visualization of an observation of various diseases that affect the visual function can also be considered not only with the observation alone but also with an association with a distribution of the photoreceptor cells.

When the OCT is employed, using a thickness of the entirety or each layer of a retina, particularly a thickness of a nerve fiber layer or a ganglion cell layer as information from the retina can be considered, which can be extracted in the same manner as Step S250. In addition, a luminance value of each layer detected from the retina including an external limiting membrane (ELM) or a photoreceptor inner/outer segment boundary (IS/OS), cone outer segment tips (COST), RPE, and GCC, in which the luminance is decreased by a retinal degeneration, or a thickness of the layer can also be used. Further, a value obtained based on a lesion of the retina such as an abnormality portion including a leukoma or a cyst, a retinal detachment, and the like can be detected, and this value can be used as the characteristic value.

The different modalities include observations detected from an eye fundus photography, a fluorescein fundus angiography, and an autofluorescence. The observations are, for example, a macular atrophy and a yellowish plaque. In this case, the characteristic value in the present invention corresponds to a signal intensity of the autofluorescence.

Although the analysis is performed by using the thickness of the whole choroid in the first embodiment, a volume of a choroid blood vessel created by an optical coherence angiography (OCA), which creates a choroid blood vessel image in a more direct manner among the choroid, can be displayed for each photoreceptor cell. In addition, by extracting only an area corresponding to a blood vessel from a modality that is considered to observe a choroid circulation in a more direct manner, such as a Doppler OCT or a scattering OCT, a volume of the area can be displayed for each photoreceptor cell. That is, it is preferred that the second image in the present invention be an image obtained from a fundus of the eye to be inspected, and more preferably, be a tomographic image of the fundus.

Third Embodiment

In a third embodiment of the present invention, when calculating the volume of the choroid per photoreceptor cell by using the method presented in the first embodiment, the volume of the choroid per photoreceptor cell is visualized by using a value accumulated over time based on a value of the thickness of the choroid when images of the same eye to be inspected are taken over time. In most cases, a damage on the photoreceptor cell is not caused by only a situation at the time of acquiring its image but by a continued influence over time. Therefore, in the third embodiment, a visualization of the continued temporal influence is described.

A functional configuration of the image processing apparatus 10 according to the third embodiment is basically the same as that illustrated in FIG. 1, and a description thereof is omitted.

A processing procedure of the image processing apparatus 10 according to the third embodiment is described below with reference to a flowchart illustrated in FIG. 8. Steps S210, S220, S230, and S280 in the flowchart illustrated in FIG. 8 are the same as those of the first embodiment, and a description thereof is omitted.

In the first embodiment, one tomographic image group is associated with the two-dimensional image acquired by the adaptive optics SLO. However, in the third embodiment, information on a temporal change is obtained and used from a plurality of tomographic image groups acquired over time, which is different from the first embodiment. Therefore, the tomographic image groups are acquired in Step S540 for the same eye to be inspected as the two-dimensional image acquired in Step S210 with different dates and times from one another, and in Step S550, the thickness of the choroid is measured from all the tomographic image groups. In Step S550, in addition to an alignment of a projection image generated from one two-dimensional image and one tomographic image group, an alignment of projection images generated from the plurality of tomographic image groups is executed at the same time, to thereby perform an association of all the images. In Step S570, an analysis considering the temporal change is performed for each photoreceptor cell, and a visualization is performed.

Each step is described in detail below.

(Step S540)

In Step S540, the image acquiring unit 100 acquires a plurality of tomographic image groups to be analyzed from the OCT connected to the image processing apparatus 10 or a database storing therein the tomographic images taken by the OCT. The acquired tomographic image groups are stored in the memory unit 130 via the control unit 120. The plurality of tomographic image groups to be analyzed are images obtained by taking the same eye to be inspected as the two-dimensional image stored in the memory unit 130, and are composed of at least two tomographic image groups including a tomographic image having date and time of taking the image closest to that of the two-dimensional image.

(Step S550)

In Step S550, the layer extracting unit 143 detects a boundary of layers of the choroid for each of the tomographic image groups stored in the memory unit 130. A segmentation method of the layers is the same as that performed in Step S250, and a description thereof is omitted.

(Step S560)

In Step S560, the alignment unit 144 executes an alignment of the two-dimensional image stored in the memory unit 130 and the plurality of tomographic image groups. In order to execute the alignment, a projection image is created by the same method as the one described in Step S260 for each of the plurality of tomographic image groups.

An alignment of a plurality of projection images thus created is executed. The alignment is executed in an automatic manner by using an anatomic characteristic such as a blood vessel seen on the projection image to obtain the best evaluation value. The alignment is mainly executed such that a degree of overlapping of the blood vessel areas extracted from the projection images is maximized. However, as is described in Step S260, a distance between corresponding landmarks when focusing attention on an area having a characteristic geometric shape such as a vascular bifurcation, or an evaluation value calculated from the entire image, such as a mean squared error of a luminance value, a correlation coefficient, and a mutual information amount, can also be used.

In addition, an alignment of the two-dimensional image acquired by the adaptive optics SLO is executed with respect to the plurality of aligned projection images. An alignment method here is the same as the one described in Step S260.

(Step S570)

In Step S570, the analysis unit 145 calculates the amount of the choroid per photoreceptor cell considering the temporal change from the distribution of the photoreceptor cells obtained from the two-dimensional image stored in the memory unit 130 and the information on the thickness of the choroid obtained from the plurality of tomographic image groups.

Firstly, an interpolation of the thickness of the choroid is performed between the tomographic image groups by using the same method as that described in Step S270. This enables a plurality of thicknesses of the choroid at different times from one another to correspond to areas on the plurality of aligned projection images.

Subsequently, positions of the two-dimensional image taken by the adaptive optics SLO and each photoreceptor cell detected on the image on the projection image are acquired based on the result of the alignment executed in Step S560. The thicknesses of the choroid at a corresponding position at different times are then acquired. In the same manner as Step S270, after an integral value of the choroid in an area occupied by each photoreceptor cell is calculated for each date and time of taking the image, an integral value is also obtained by summing values in a time direction. A method of summing the values includes performing a linear interpolation reflecting a fact that an interval between dates and times of the plurality of tomographic image groups is different and calculating the integral value by summing interpolated values.

A map is created which is visualized by changing colors of the Voronoi diagram based on the integral value.

That is, in the third embodiment, time-varying data is used as the characteristic value in the present invention, and the characteristic value calculation unit calculates a time-varying characteristic value in the above-mentioned manner, which is used as data for the visualization.

The thus-calculated map in which the amount of the choroid per photoreceptor cell is visualized considering the temporal change is sent to the control unit 120 and stored in the memory unit 130 at the same time.

Figure 10A:
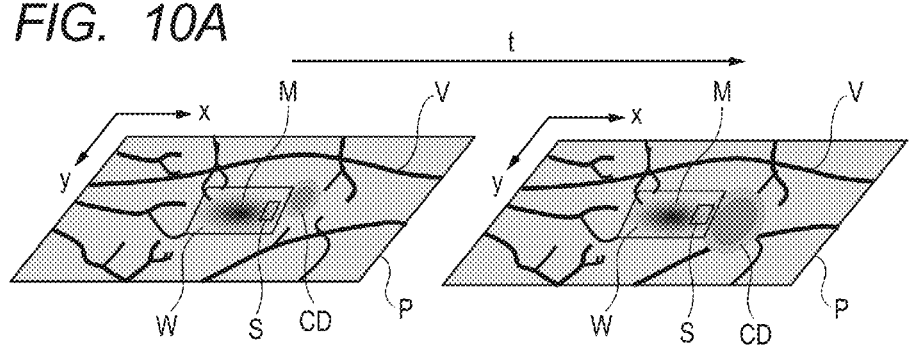
FIGS. 10A, 10B and 10C are diagrams illustrating projected diagrams and display examples according to the third embodiment displayed in the same manner as those illustrated in FIGS. 9A, 9B and 9C.
Figure 10B:
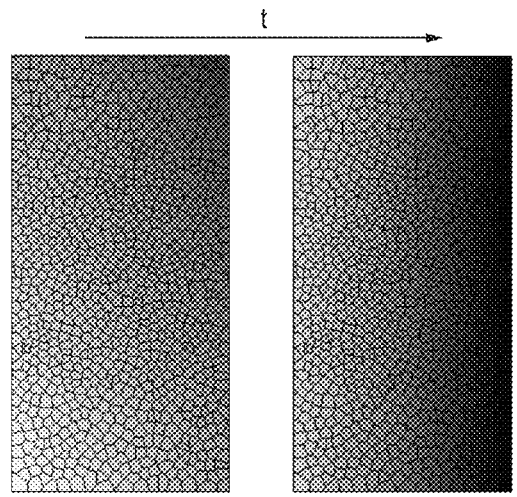
Figure 10C:
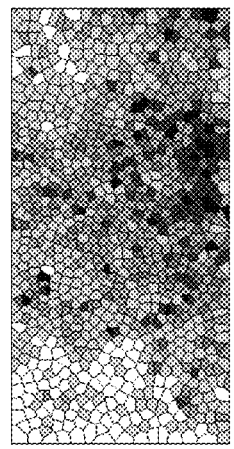

FIGS. 10A to 10C illustrate display examples of the map according to the third embodiment. FIG. 10A illustrates a mapping of the temporal change of a site (CD) in which the thickness of the choroid detected by the OCT is thin on the projection image. In FIG. 10A, the CD is extended from a right top portion of the image acquisition position on the adaptive optics SLO to the entire right side. In the same manner as FIG. 9B, coloring only for the thickness of the choroid on the Voronoi display of the adaptive optics SLO image illustrated in FIG. 4B produces the temporal change as illustrated in FIG. 10B. In FIG. 10B, an increase of a density of the color indicates a decrease of the thickness of the choroid.

In the same manner as the first embodiment, in an area in which the density of the photoreceptor cells is high, an influence of the change in the thickness of the choroid is increased.

The influence on each photoreceptor cell is increased as a state in which the thickness of the choroid is thin lasts longer. In order to reflect this fact, a case where the color of each Voronoi area is determined by accumulating the thickness of the choroid over time is illustrated in FIG. 10C. In FIG. 10C, an increase of a density of the color indicates a decrease of the amount of the choroid of each photoreceptor cell.

In FIG. 10C, as illustrated in FIG. 10B, an area of dense color is concentrated on an upper portion compared to FIG. 9C, reflecting a fact that a state in which the thickness of the choroid is thin is maintained for a longer period of time in the upper right direction.

With the above configuration, when performing an analysis of photoreceptor cells by using a two-dimensional image acquired by the adaptive optics SLO apparatus, an image obtained by combining information obtained by accumulating over time the information obtained from the OCT can be displayed. With such a display, for example, the time-varying amount of the thickness of the choroid per photoreceptor cell can be visualized, enabling a visualization of an effect of the change of the thickness of the choroid on each photoreceptor cell.

Another Embodiment

It should be understood that the object of the present invention can also be achieved with the following configuration. A software program code for implementing the functions of the above-mentioned embodiments is stored on a storage medium, and the storage medium is supplied to a system or an apparatus. Then, a computer (or CPU or MPU) of the system or the apparatus reads out and executes the program code stored on the storage medium.

Further, the present invention is also implemented by executing the following processing. Specifically, in this processing, software (program) for implementing the functions of the above-mentioned embodiments is supplied to a system or an apparatus via a network or various kinds of storage medium, and a computer (or CPU, MPU, etc.) of the system or the apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-193914, filed Sep. 6, 2011, and Japanese Patent Application No. 2012-190565, filed Aug. 30, 2012, which are hereby incorporated by reference herein in their entirety.

What is claimed is:

1. An image processing apparatus, comprising:
    an extraction unit configured to extract each cell region of a plurality of cells from a first image of a fundus of an eye to be inspected;
    a characteristic value calculation unit configured to, for each extracted cell region of the plurality of cells extracted from the first image, calculate, from a plurality of second images of the fundus, a value indicating a volume of a layer corresponding to the extracted cell region; and
    a display control unit configured to display, on a display unit, each extracted cell region so as to have a display status corresponding to the value indicating the volume.

2. An image processing apparatus according to claim 1, wherein the value comprises a value obtained by integrating a thickness of a choroid of the fundus.

3. An image processing apparatus according to claim 1, wherein the display control unit displays, on the display unit, an image visualized by associating a density of the plurality of cells with the value.

4. An image processing apparatus according to claim 1, wherein the display control unit includes a display coloring unit configured to perform a coloring on each extracted cell region based on the value.

5. An image processing apparatus according to claim 1, wherein the first image comprises a planar image of the fundus of the eye to be inspected, and
    wherein each of the plurality of second images comprises a tomographic image of the fundus of the eye to be inspected.

6. An image processing apparatus according to claim 1, wherein the value comprises a value obtained based on (a) a thickness of a layer detected from a retina, the layer including IS/OS, RPE, or GCC, and/or (b) a lesion of the retina.

7. An image processing apparatus comprising:
    a characteristic value calculation unit configured to calculate a characteristic value of an area of a second image of a fundus of an eye to be inspected corresponding to a predetermined area in a first image including photoreceptor cells of the fundus of the eye to be inspected; and
    a display control unit configured to display, on a display unit, an image obtained by visualizing the characteristic value,
    wherein the characteristic value comprises a time-varying value, and
    wherein the characteristic value calculation unit calculates the characteristic value, which is used in displaying the visualized image, by accumulating the characteristic value having changed with time.

8. An image processing apparatus comprising:
    a photoreceptor cell analysis unit configured to, for each of a plurality of photoreceptor cells, analyze, from a first image of a fundus of an eye to be inspected, an area corresponding to the photoreceptor cell;
    a fundus analysis unit configured to analyze, from a second image of the fundus, a characteristic value at each position in the second image of the fundus;
    an image associating unit configured to associate the first image with the second image;
    a characteristic value calculation unit configured to calculate the characteristic value of an area of the second image corresponding to the analyzed area in the first image; and
    a display control unit configured to display, on a display unit, an image obtained by visualizing the characteristic value.

9. An image processing apparatus according to claim 8, wherein the image associating unit executes an alignment of the first image and the second image as the association of the first image with the second image.

10. An image processing apparatus according to claim 8, wherein the first image comprises a planar image of the fundus of the eye to be inspected, and
    wherein the second image comprises a plurality of tomographic images of the fundus of the eye to be inspected.

11. An image processing apparatus according to claim 10, wherein the characteristic value comprises information about blood vessels calculated by Optical Coherence Angiography.

12. An image processing apparatus according to claim 8, wherein the first image comprises a planar image of the fundus of the eye to be inspected, and
    wherein the second image comprises a planar image of the fundus of the eye to be inspected.

13. An image processing apparatus according to claim 12, wherein the characteristic value comprises a signal intensity of an autofluorescence.

14. An image processing method, comprising:
extracting each cell region of a plurality of cells from a first image of a fundus of an eye to be inspected;
for each extracted cell region of the plurality of cells, calculating, from a plurality of second images of the fundus, a value indicating a volume of a layer corresponding to the extracted cell region; and
displaying, on a display unit, each extracted cell region so as to have a display status corresponding to the value indicating the volume.

15. An image processing method according to claim 14, wherein the value comprises a value obtained by integrating a thickness of a choroid of the fundus.

16. An image processing method according to claim 14, wherein the displaying comprises displaying, on the display unit, an image visualized by associating a density of the plurality of cells with the value.

17. A computer-readable storage medium storing a program for causing a computer to execute the steps of the image processing method according to claim 14.

18. An image processing apparatus for processing an image of photoreceptor cells of a fundus, the image processing apparatus comprising:
an analysis unit configured to analyze a predetermined layer of the fundus from a tomographic image of the fundus;
a calculation unit configured to, for each cell region of the photoreceptor cells in the image, calculate, based on an analysis result of the tomographic image, a thickness of the predetermined layer corresponding to the cell region; and
a display control unit configured to display, on a display unit, each cell region so as to have a display status corresponding to the thickness of the predetermined layer.

19. An image processing apparatus according to claim 18, wherein the calculation unit calculates a volume of each cell region of the photoreceptor cells in the image by using the thickness of the predetermined layer and an area of the cell region, and
wherein the display control unit displays, on a display unit, an image visualized by associating the volume with each cell region.

20. An image processing apparatus according to claim 18, wherein the calculation unit calculates a density of the photoreceptor cells in the image, and
wherein the display control unit displays, on the display unit, an image visualized by associating the density with the thickness of the predetermined layer.

21. An image processing apparatus according to claim 18, wherein the predetermined layer comprises a choroid.

22. An image processing method comprising:
for each of a plurality of photoreceptor cells, analyzing, from a first image of a fundus of an eye to be inspected, an area corresponding to the photoreceptor cell;
analyzing, from a second image of the fundus, a characteristic value at each position in the second image of the fundus;
associating the first image with the second image;
calculating the characteristic value of an area of the second image corresponding to the analyzed area in the first image; and
displaying, on a display unit, an image obtained by visualizing the characteristic value.

23. An image processing method according to claim 22, wherein the characteristic value comprises a value obtained by integrating a thickness of a choroid of the fundus.

24. An image processing apparatus comprising:
an extraction unit configured to extract a photoreceptor cell region of a photoreceptor cell from a first image of a fundus of an eye to be inspected;
a calculation unit configured to calculate, from a second image of the fundus, a value indicating a thickness of a layer corresponding to the extracted cell region; and
a display control unit configured to display, on a display unit, the extracted cell region so as to have a display status corresponding to the value indicating the thickness.

25. An image processing apparatus according to claim 24, wherein the layer comprises a choroid of the fundus.

26. An image processing apparatus according to claim 24, wherein the display control unit includes a display coloring unit configured to perform a coloring on the extracted cell region based on the value.

27. An image processing apparatus according to claim 24, wherein the first image comprises a planar image of the fundus of the eye to be inspected, and
wherein the second image comprises a tomographic image of the fundus of the eye to be inspected.

28. An image processing apparatus comprising:
an extraction unit configured to extract a photoreceptor cell region of a photoreceptor cell from a planar image of a fundus of an eye to be inspected;
a first calculation unit configured to calculate, from a tomographic image of the fundus, a value indicating a thickness corresponding to the extracted photoreceptor cell region; and
a second calculation unit configured to calculate a volume of the extracted photoreceptor cell region by using the thickness and an area of the extracted photoreceptor cell region.

29. An image processing apparatus according to claim 28, further comprising a display control unit configured to display, on a display unit, the extracted photoreceptor cell region so as to have a display status corresponding to the volume.

30. An image processing method comprising:
extracting a photoreceptor cell region of a photoreceptor cell from a first image of a fundus of an eye to be inspected;
calculating, from a second image of the fundus, a value indicating a thickness of a layer corresponding to the extracted cell region; and
displaying, on a display unit, the extracted cell region so as to have a display status corresponding to the value indicating the thickness.

31. An image processing method according to claim 30, wherein the layer comprises a choroid of the fundus.

32. An image processing method according to claim 30, wherein the displaying step includes a display coloring step for performing a coloring on the extracted cell region based on the value.

33. An image processing method according to claim 30, wherein the first image comprises a planar image of the fundus of the eye to be inspected, and
wherein the second image comprises a tomographic image of the fundus of the eye to be inspected.

34. An image processing method comprising:
extracting a photoreceptor cell region of a photoreceptor cell from a planar image of a fundus of an eye to be inspected;

calculating, from a tomographic image of the fundus, a value indicating a thickness corresponding to the extracted photoreceptor cell region; and calculating a volume of the extracted photoreceptor cell region by using the thickness and an area of the extracted photoreceptor cell region.

* * * * *